US009806989B2

(12) United States Patent
Keesara et al.

(10) Patent No.: US 9,806,989 B2
(45) Date of Patent: Oct. 31, 2017

(54) LAYER 3 (L3) BEST ROUTE SELECTION RULE FOR SHORTEST PATH BRIDGING MULTICAST (SPBM) NETWORKS

(71) Applicant: Extreme Networks, Inc., San Jose, CA (US)

(72) Inventors: Srikanth Keesara, Tewksbury, MA (US); Gautam Khera, Walpole, MA (US); Vedavinayagam Ganesan, Nashua, NH (US)

(73) Assignee: Extreme Networks, Inc., San Jose, CA (US)

( * ) Notice: Subject to any disclaimer, the term of this patent is extended or adjusted under 35 U.S.C. 154(b) by 229 days.

(21) Appl. No.: 13/905,764

(22) Filed: May 30, 2013

(65) Prior Publication Data

US 2014/0355416 A1    Dec. 4, 2014

(51) Int. Cl.
| | |
|---|---|
| *H04L 12/28* | (2006.01) |
| *H04L 12/721* | (2013.01) |
| *H04L 12/707* | (2013.01) |
| *H04L 12/24* | (2006.01) |
| *H04L 12/703* | (2013.01) |

(52) U.S. Cl.
CPC ............ *H04L 45/127* (2013.01); *H04L 45/24* (2013.01); *H04L 41/0668* (2013.01); *H04L 45/28* (2013.01)

(58) Field of Classification Search
CPC ....... H04L 45/28; H04L 45/24; H04L 45/726; H04L 45/22; H04L 12/4658; H04L 12/4662; H04L 47/726; H04L 45/16; H04L 45/18; H04L 45/12; H04L 41/0654; H04L 43/0811; H04L 45/245; H04L 12/18; H04L 45/74; H04L 12/462; H04L 45/02; H04L 45/48; H04L 12/4625; Y02B 60/33; G06F 3/0635

USPC ..... 370/219, 40, 395.53, 395.531, 401, 218; 709/220, 239
IPC ................. H04L 45/28,45/24, 45/127, 41/0668
See application file for complete search history.

(56) References Cited

U.S. PATENT DOCUMENTS

| | | | |
|---|---|---|---|
| 2008/0228943 A1* | 9/2008 | Balus .................... | H04L 12/462 709/239 |
| 2012/0063465 A1* | 3/2012 | Keesara .............. | H04L 12/4633 370/401 |

(Continued)

FOREIGN PATENT DOCUMENTS

| | | | | |
|---|---|---|---|---|
| CN | WO 2011147351 A1 * | 12/2011 | ............. | H04L 45/24 |
| EP | 2618528 | 7/2013 | | |

(Continued)

OTHER PUBLICATIONS

GB Search Report dated Jun. 12, 2014, 3 pages.

*Primary Examiner* — Alex Skripnikov
*Assistant Examiner* — Lionel Preval
(74) *Attorney, Agent, or Firm* — Haley Guiliano LLP (57) ABSTRACT

A method, apparatus and computer program product for providing a best route selection rule is presented. A determination is made at a first edge router, whether a second edge router in a network advertises a first BMAC address and at least one other BMAC address When the second edge router advertises only a first BMAC address, then the first BMAC address is used in a routing table for a Layer 3 (L3) next hop for a route. When the second edge router advertises more than one BMAC address, at least one other BMAC address is used in the routing table for said L3 next hop for the route.

20 Claims, 3 Drawing Sheets

(56) References Cited

U.S. PATENT DOCUMENTS

| | | | |
|---|---|---|---|
| 2013/0080602 A1* | 3/2013 | Keesara | H04L 12/4641 709/220 |
| 2013/0195111 A1* | 8/2013 | Allan et al. | 370/395.53 |
| 2014/0177433 A1* | 6/2014 | Casey | H04L 45/02 370/218 |

FOREIGN PATENT DOCUMENTS

| | | | |
|---|---|---|---|
| GB | 2483563 | | 3/2012 |
| WO | WO 2011147351 | * | 12/2011 |
| WO | WO2011147351 | | 12/2011 |

* cited by examiner

LAYER 3 (L3) BEST ROUTE SELECTION RULE FOR SHORTEST PATH BRIDGING MULTICAST (SPBM) NETWORKS

BACKGROUND

Intermediate System to Intermediate System (ISIS) is a routing protocol designed to move information efficiently within a computer network, a group of physically connected computers or similar devices. ISIS accomplishes this by determining the best route for packets through a packet-switched network. The protocol was defined in ISO/IEC 10589:2002 as an international standard within the Open Systems Interconnection (OSI) reference design. Though originally an ISO standard, the IETF republished the protocol as an Internet Standard in RFC 1142. IS-IS has been called the de facto standard for large service provider network backbones.

Shortest Path Bridging (SPB) uses ISIS as the control protocol to transfer routing information between devices in an SPB Network acting as a transport network between access networks which may be running different protocols. In an SPB network, the ISIS Link State Database (LSDB) is used to advertise routing information.

When ISIS comes up, there is certain information that needs to be learned (link state information, etc.) in order to build forwarding tables. There can be a lot of churn in all the nodes as the learning of the information happens simultaneously. This is especially true in larger networks or networks where different routing protocols are used within the same network.

ISIS Type Length Values (TLVs) are used to advertise Layer 3 (L3) routes in an SPB Network. It is common practice to deploy SPB Networks where a given route ends up being advertised by more than one SPB Node. In such situations—the best route selection process ends up selecting one of the advertising routers as the L3 Next-Hop Node for each such route. The route then is represented in the Route Table as Lookup (Route Prefix)->(BVLAN, BMAC) where the BVLAN is one of the BVLANs used in the SPB Network and the BMAC is the ISIS system-id of SPB Node selected as the Next-Hop for that Route. Traffic using that route is then forwarded to the selected SPB Node using the (BVLAN, BMAC) based forwarding in the core of the SPB Network.

SUMMARY

With this method of assigning the L3 Next-Hop as the edge router, in the event of the Core Node or a Core Link failure—traffic can recover by simply modifying the L2 (BVLAN, BMAC) forwarding record. The number of (BVLAN, BMAC) records are a linear function of the number of nodes in the SPB Network and are independent of the number of L3 Routes which can be quite high. So in general—L3 traffic recovery in the event of core node/link up/down inside the SPB Network—is independent of the number of L3 routes and hence is very efficient.

Conventional mechanisms such as those explained above suffer from a variety of deficiencies. The failure of a L3 Edge Node is handled quite differently than a failure of a core node or link. For a given route that was using the failed SPB Node as L3-NextHop, route selection is performed again and if one of the other surviving SPB Nodes is advertising the route—it is selected as the L3 Next-Hop for that route. The route is now represented as Lookup(Router Prefix)->(BVLAN, BMAC=ISIS system-id of the new Next-Hop). Once the modified route is installed in the forwarding plane, the traffic using that route recovers. Until then the traffic using that route is lost. In the case of the failure of a L3 Egress Next-Hop Node—the traffic recovery for each route happens as that route is reprogrammed. Accordingly, when there are a large number of routes—it could take a long time before the traffic completely recovers.

Embodiments of the invention significantly overcome such deficiencies and provide mechanisms and techniques that provide an L3 best route selection rule for SPBM networks. The present invention provides a solution in which the traffic loss for a L3 Egress Node failure is independent of the number of L3 Routes pointing to that Node. An ideal solution would have similar convergence times for an Edge Node failures and core node/link failures.

In a particular embodiment of a method for providing a L3 best route selection rule for SPBM networks the method includes determining, at a first edge router whether a second edge router in a network advertises a first BMAC address and at least one other BMAC address. When the second edge router advertises only a first BMAC address, then the first BMAC address is used in a routing table for a Layer 3 (L3) next hop for a route. On the other hand, when the second edge router advertises more than one BMAC address, then one of the more than one BMAC address is used in the routing table for the L3 next hop for the route.

Other embodiments include a computer readable medium having computer readable code thereon for providing a L3 best route selection rule for SPBM networks. The computer readable medium includes instructions for determining, at a first edge router whether a second edge router in a network advertises a first BMAC address and at least one other BMAC address. The computer readable medium includes instructions wherein when the second edge router advertises only a first BMAC address, then the first BMAC address is used in a routing table for a Layer 3 (L3) next hop for a route. The computer readable medium further includes instructions wherein when the second edge router advertises more than one BMAC address, then one of the more than one BMAC address is used in the routing table for the L3 next hop for the route.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a L3 best route selection rule for SPBM networks as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a L3 best route selection rule for SPBM networks as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

The presently described method and apparatus for providing a best route selection rule improves the convergence time L3 Routes traffic in a SPB network in certain node failure scenarios. In an SPB network IP routes are installed in the routing table and point to the final edge router. Even though traffic goes through some core routers in between, the actual route installation is based on installing as pointing to an edge router. Stated differently, the route installation points to the exit device of the network and not to an intermediate device as the next hop. What this allows is that when core topology changes—the IP routes do not need to be updated to maintain/recover connectivity. Only the next-hop records needs to be updated.

For changes inside the network (e.g., link failures, device failures, devices coming back up, etc.) the fewer device records that need to be updated, the faster recovery can occur.

Figure 1:
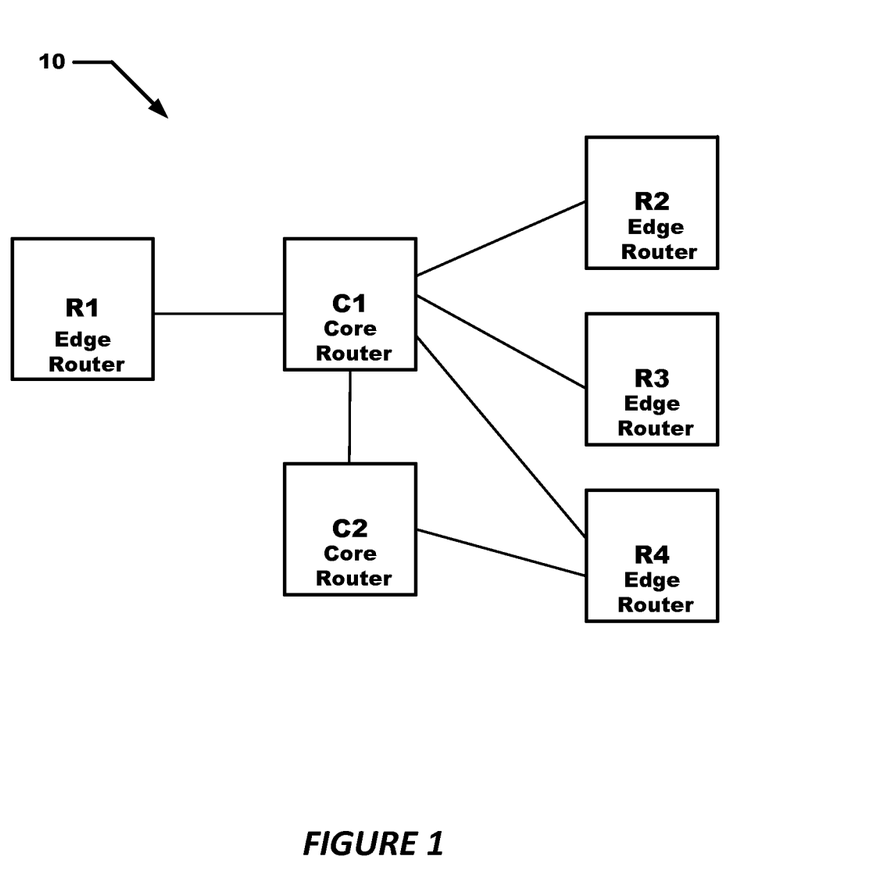
FIG. 1 depicts a block diagram of a network in accordance with embodiments of the invention.

Referring to FIG. 1, a network 10 is shown. Network 10 includes edge routers R1, R2, R3 and R4. Network 10 also includes core routers C1 and C2. A route is installed in R1's routing table pointing to the MAC address of R2. When traffic starts, for traffic destined to R2, the MAC address of the packet will be changed to the MAC address of R2. In the event R2 goes down, the network does not know how to forward to R2, so packets destined to R2 get dropped until R1 starts forwarding packets to a new exit point (for example R3). Until R1 updates its routing table, packets to R2 get dropped. When there are a large number of routes, it can take a great deal of time until all the routes are updated, which is until R1 has completely updated the route table). In this scenario recovery time is dependent upon the number of routes as opposed to the size of the network.

By way of the present invention, if R2 is advertising multiple MAC addresses (a first MAC address and at least one other MAC address) one of the other advertised MAC addresses for R2 is used in the routing table. If R2 is only advertising a first MAC address, then that first MAC address is used. In network 10, edge nodes R2, R3, R4 advertise multiple MAC addresses. The first MAC address for each of edge nodes R2, R3 and R4 is the respective system identifier of the respective edge router. The second MAC address advertised by each edge router is the Shared MAC address. The edge nodes R2, R3 and R4 all advertise same shared MAC address. When R2 fails, the only loss that occurs is while the MAC address changes. Only a single record needs change, as opposed to conventional systems wherein routes are learned using the new node.

The present route selection rule keeps the process of selecting the L3 Next-Hop node for SPB Routes the same as the existing solution. But if the selected L3 Next-Hop node advertises more than one BMAC (i.e.—advertises a BMAC other than its own ISIS system-id)—then that other BMAC of the selected node is used in the route-table. For example if the selected SPB Next-Hop node can be reached by using both system-id (BMAC1) and another BMAC (BMAC2)— the route for which that is the L3 Next-Hop node would use (BVLAN, BMAC2) as the Next-Hop instead of (BLVAN, BMAC1).

The effect of the above change is quite dramatic in networks that deploy a redundant cluster of SPB Nodes (SMLT for example) to advertise a shared set of L3 routes. They could all use a single shared BMAC address (for example a Cluster BMAC). Using the above invention routes using one of the nodes in the cluster as the L3 Next-Hop point to the Cluster BMAC instead of the ISIS system-id of the selected node. When the selected node fails, the Cluster BMAC is quickly re-pointed at one of the surviving nodes in the cluster. The time to do this is independent of the number of L3 Routes. This means that routed traffic headed for a cluster of SPB Nodes which share a BMAC to anchor the routes converges in a time that is independent of the of the number of L3 routes when one of the nodes in the cluster fails.

Figure 2:
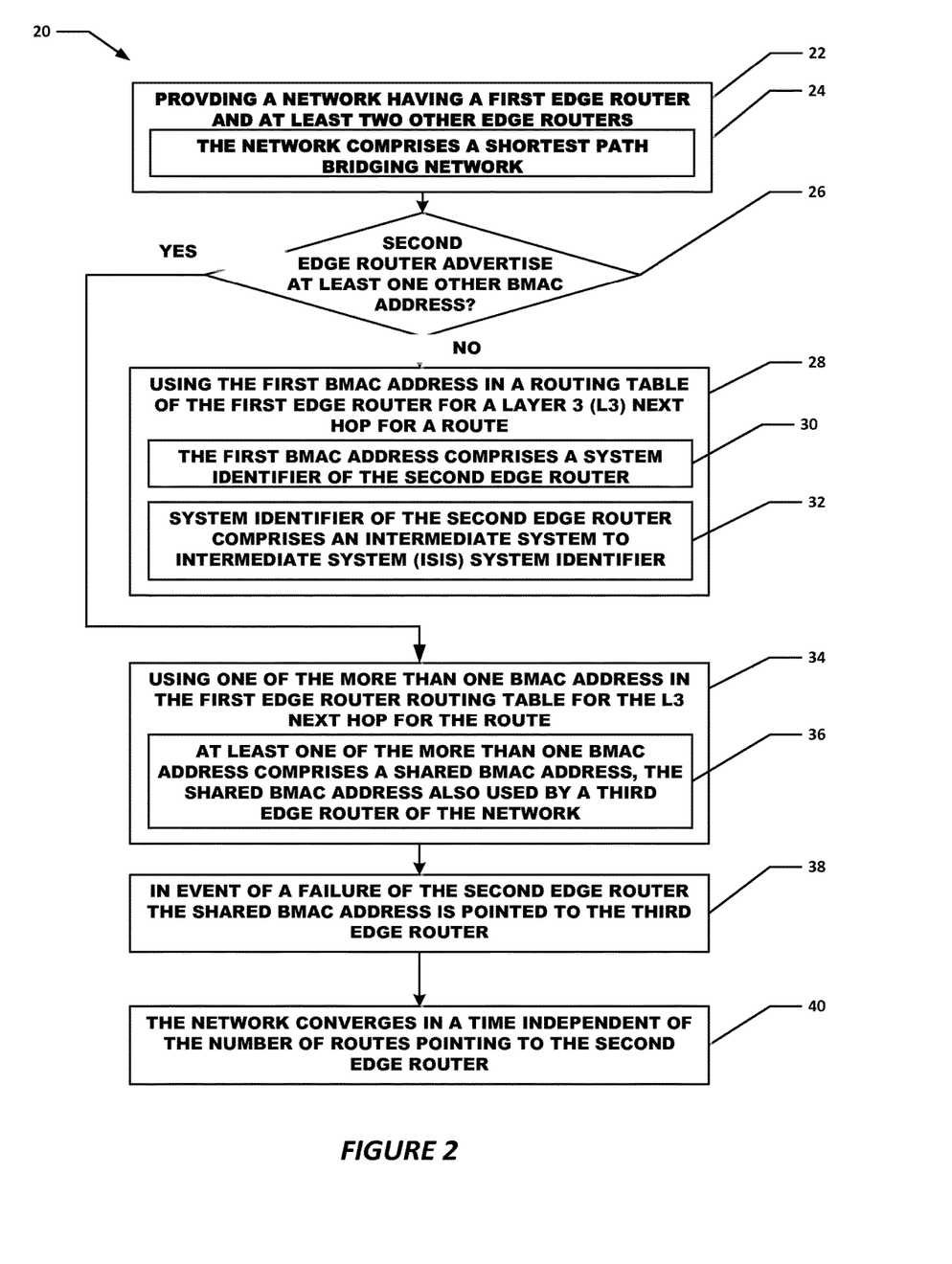
FIG. 2 illustrates a flow diagram of a particular embodiment of a method for providing a best route selection rule in accordance with embodiments of the invention.

A flow chart of a particular embodiment of the presently disclosed method is depicted in FIG. 2. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 20 for providing a route selection rule is shown. Method 20 begins with processing block 22 which recites providing a network having a first edge router and at least two other edge routers (a second edge router and a third edge router). The first edge router acts as an ingress router, and the at least two other edge routers comprise egress edge routers. There may also be one or more core routers disposed between the ingress edge router and the two or more egress edge routers. As recited in processing block 24, in certain embodiments the network comprises a Shortest Path Bridging (SPB) network.

Processing continues at decision block 26, wherein a determination is made regarding whether the second edge router advertises a first BMAC address and at least one other BMAC address. When the second edge router advertises only a single BMAC address, then processing continues with processing block 28, wherein when the second edge router advertises more than one BMAC address processing continues with processing block 34.

Proceeding now at processing block 28, when the second edge router advertises only a first BMAC address, using the first BMAC address in a routing table of the first edge router for a Layer 3 (L3) next hop for a route. As shown at processing block 30 the first BMAC address comprises a system identifier of the second edge router. As further shown at processing block 32 system identifier of the second edge router comprises an Intermediate System to Intermediate System (ISIS) system identifier.

Proceeding now at processing block 34 when the second edge router advertises more than one BMAC address, using one of the more than one BMAC address in the first edge router routing table for the L3 next hop for the route.

As further recited in processing block 36 at least one of the more than one BMAC address comprises a shared BMAC address, the shared BMAC address also used by a third edge router of the network. In certain embodiments the egress edge nodes all advertise same shared BMAC address.

Processing block 38 discloses wherein in event of a failure of the second edge router the shared BMAC address is pointed to the third edge router. When the second edge router fails, the only loss that occurs is while the MAC address changes. Only a single record needs change, as opposed to conventional systems wherein routes are learned using the new node and the routing table of the first edge router are updated accordingly.

Processing block 40 states wherein the network converges in a time independent of the number of routes pointing to the second edge router. The time to do this is independent of the number of L3 Routes. This means that routed traffic headed for a cluster of SPB Nodes which share a BMAC to anchor the routes converges in a time that is independent of the of the number of L3 routes when one of the nodes in the cluster fails.

Figure 3:
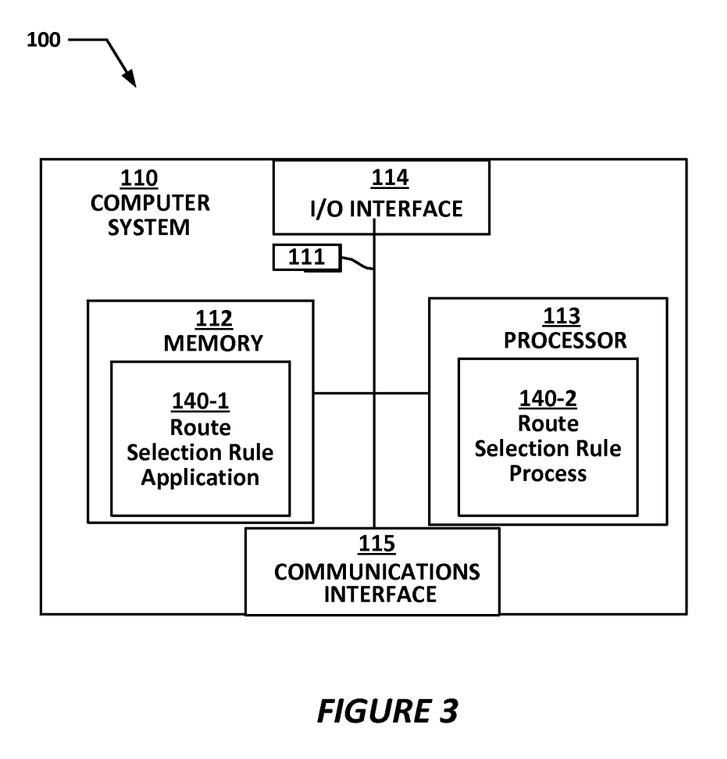
FIG. 3 illustrates an example computer system architecture for a computer system providing a best route selection in accordance with embodiments of the invention.

FIG. 3 is a block diagram illustrating example architecture of a computer system 110 that executes, runs, interprets, operates or otherwise performs a route selection rule operating application 140-1 and route selection rule operating process 140-2 suitable for use in explaining example configurations disclosed herein. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a route selection rule operating application 140-1 as explained herein. The route selection rule operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a route selection rule operating application 140-1. Execution of a route selection rule operating application 140-1 in this manner produces processing functionality in the route selection rule operating process 140-2. In other words, the route selection rule operating process 140-2 represents one or more portions or runtime instances of a route selection rule operating application 140-1 (or the entire a route selection rule operating application 140-1) performing or executing within or upon the processor 113 in the computerized device 110 at runtime.

It is noted that example configurations disclosed herein include the route selection rule operating application 140-1 itself (i.e., in the form of un-executed or non-performing logic instructions and/or data). The route selection rule operating application 140-1 may be stored on a computer readable medium (such as a floppy disk), hard disk, electronic, magnetic, optical, or other computer readable medium. A route selection rule operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a route selection rule operating application 140-1 in the processor 113 as the route selection rule operating process 140-2. Those skilled in the art will understand that the computer system 110 may include other processes and/or software and hardware components, such as an operating system not shown in this example.

During operation, processor 113 of computer system 100 accesses memory system 112 via the interconnect 111 in order to launch, run, execute, interpret or otherwise perform the logic instructions of the route selection rule application 140-1. Execution of route selection rule application 140-1 produces processing functionality in route selection rule process 140-2. In other words, the route selection rule process 140-2 represents one or more portions of the route selection rule application 140-1 (or the entire application) performing within or upon the processor 113 in the computer system 100.

It should be noted that, in addition to the route selection rule process 140-2, embodiments herein include the route selection rule application 140-1 itself (i.e., the un-executed or non-performing logic instructions and/or data). The route selection rule application 140-1 can be stored on a computer readable medium such as a floppy disk, hard disk, or optical medium. The route selection rule application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of route selection rule application 140-1 in processor 113 as the route selection rule process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
   determining, at a first edge router, that a second edge router in a network advertises a first Backbone Media Access Control (BMAC) address and a shared BMAC address, where said shared BMAC address is shared by a cluster of edge routers;
   determining, at said first edge router, that a third edge router in a network advertises a second Backbone Media Access Control (BMAC) address and said shared BMAC address;
   using said shared BMAC address in a routing table for a Layer 3 (L3) next hop for a route;
   pointing, using a first record separate from the routing table, said shared BMAC address to said first BMAC address associated with the second edge router for said L3 next hop for said route;
   detecting that said second edge router has failed; and
   re-pointing said shared BMAC address to said third edge router in said cluster of edge routers by updating said first record to point said shared BMAC address to said second BMAC address associated with the third edge router, without modifying said route in said routing table, such that a time to recover connectivity is independent of a number of L3 routes in said routing table.

2. The method of claim 1 wherein determining, at a first edge router, that a second edge router in a network advertises a first Backbone Media Access Control (BMAC) address comprises determining that said second edge router advertises said first BMAC address as a system identifier of said second edge router.

3. The method of claim 1 wherein said shared BMAC address comprises a cluster BMAC address shared by a redundant cluster of shortest path bridging (SPB) edge nodes, said shared BMAC address also used by a third edge router of said network.

4. The method of claim 1, wherein:
   pointing said shared BMAC address to said second edge router for said L3 next hop for said route using a first record comprises implementing said first record as a single Layer 2 (L2) forwarding record; and
   re-pointing said shared BMAC address comprises pointing said shared BMAC address to said third edge router such that the only loss that occurs is while the MAC address changes by updating said Layer 2 (L2) forwarding record.

5. The method of claim 1 wherein said network comprises a Shortest Path Bridging (SPB) network; wherein:
   re-pointing said shared BMAC address to a selected surviving one edge router in said cluster of edge routers comprises re-pointing said shared BMAC address such that routed traffic headed for the cluster of edge routers to anchor the routes converges in a time that is independent of the number of L3 routes when the second edge router fails.

6. The method of claim 1 wherein said first BMAC address comprises a system identifier of said second edge router implemented as an Intermediate System to Intermediate System (ISIS) system identifier.

7. The method of claim 1 further comprising when said failure of said second edge router occurs refraining from updating Internet Protocol (IP) routes.

8. A non-transitory computer readable storage medium having computer readable code thereon for providing a best route selection rule, the medium including instructions in which a computer system performs operations comprising:
   determining, at a first edge router, that a second edge router in a network advertises a first Backbone Media Access Control (BMAC) address and a shared BMAC address, where said shared BMAC address is shared by a cluster of edge routers;
   determining, at said first edge router, that a third edge router in a network advertises a second Backbone Media Access Control (BMAC) address and said shared BMAC address;
   using said shared BMAC address in a routing table for a Layer 3 (L3) next hop for a route;
   pointing, using a first record separate from the routing table, said shared BMAC address to said first BMAC address associated with the second edge router for said L3 next hop for said route;
   detecting that said second edge router has failed; and
   re-pointing said shared BMAC address to said third edge router in said cluster of edge routers by updating said first record to point said shared BMAC address to said second BMAC address associated with the third edge router, without modifying said route in said routing table, such that a time to recover connectivity is independent of a number of L3 routes in said routing table.

9. The computer readable storage medium of claim 8 wherein said first BMAC address comprises a system identifier of said second edge router.

10. The computer readable storage medium of claim 8 wherein said shared BMAC address comprises a cluster BMAC address shared by a redundant cluster of shortest path bridging (SPB) edge nodes, said shared BMAC address also used by a third edge router of said network.

11. The computer readable storage medium of claim 8, wherein:
   said first record is implemented as a single Layer 2 (L2) forwarding record; and
   said shared BMAC address is re-pointed to said third edge router such that the only loss that occurs is while the MAC address changes by updating said Layer 2 (L2) forwarding record.

12. The computer readable storage medium of claim 8 wherein said network comprises a Shortest Path Bridging (SPB) network; wherein:
   said shared BMAC address is re-pointed to a selected surviving one edge router in said cluster of edge routers by re-pointing said shared BMAC address such that routed traffic headed for the cluster of edge routers to anchor the routes converges in a time that is independent of the number of L3 routes when the second edge router fails.

13. The computer readable storage medium of claim 8 wherein said first BMAC address comprises a system identifier of said second edge router implemented as an Intermediate System to Intermediate System (ISIS) system identifier.

14. The computer readable medium of claim 8 further comprising when said failure of said second edge router occurs refraining from updating Internet Protocol (IP) routes.

15. A computer system comprising:
- a memory;
- a processor;
- a communications interface;
- an interconnection mechanism coupling the memory, the processor and the communications interface; and
- wherein the memory is encoded with an application providing a best route selection rule, that when performed on the processor, provides a process for processing information, the process causing the computer system to perform the operations of:
- determining, at a first edge router, that a second edge router in a network advertises a first Backbone Media Access Control (BMAC) address and a shared BMAC address, where said shared BMAC address is shared by a cluster of edge routers;
- determining, at said first edge router, that a third edge router in a network advertises a second Backbone Media Access Control (BMAC) address and said shared BMAC address;
- using said shared BMAC address in a routing table for a Layer 3 (L3) next hop for a route;
- pointing, using a first record separate from the routing table, said shared BMAC address to said first BMAC address associated with the second edge router for said L3 next hop for said route;
- detecting that said second edge router has failed; and
- re-pointing said shared BMAC address to said third edge router in said cluster of edge routers by updating said first record to point said shared BMAC address to said second BMAC address associated with the third edge router, without modifying said route in said routing table, such that a time to recover connectivity is independent of a number of L3 routes in said routing table.

16. The computer system of claim 15 wherein said first BMAC address comprises a system identifier of said second edge router.

17. The computer system of claim 15 wherein said shared BMAC address comprises a cluster BMAC address shared by a redundant cluster of shortest path bridging (SPB) edge nodes, said shared BMAC address also used by a third edge router of said network.

18. The computer system of claim 15, wherein:
- said first record is implemented as a single Layer 2 (L2) forwarding record; and
- said shared BMAC address is re-pointed to said third edge router such that the only loss that occurs is while the MAC address changes by updating said Layer 2 (L2) forwarding record.

19. The computer system of claim 15 wherein said network comprises a Shortest Path Bridging (SPB) network; wherein:
- said shared BMAC address is re-pointed to a selected surviving one edge router in said cluster of edge routers by re-pointing said shared BMAC address such that routed traffic headed for the cluster of edge routers to anchor the routes converges in a time that is independent of the number of L3 routes when the second edge router fails.

20. The computer system of claim 15 further comprising when said failure of said second edge router occurs refraining from updating Internet Protocol (IP) routes.

* * * * *